United States Patent
Hasenfratz et al.

(10) Patent No.: US 9,759,170 B2
(45) Date of Patent: Sep. 12, 2017

(54) FILTER ELEMENT, FILTER WITH A FILTER ELEMENT AND A FILTER HOUSING OF A FILTER

(71) Applicant: MANN+HUMMEL GMBH, Ludwigsburg (DE)

(72) Inventors: Robert Hasenfratz, Waiblingen (DE); Fabian Wagner, Moeglingen (DE); André Roesgen, Remshalden (DE); Christian Thalmann, Speyer (DE); Frank Pflueger, Sachsenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 277 days.

(21) Appl. No.: 14/329,971

(22) Filed: Jul. 13, 2014

(65) Prior Publication Data

US 2015/0013289 A1    Jan. 15, 2015

(30) Foreign Application Priority Data

Jul. 12, 2013   (DE) .......................... 10 2013 011 613

(51) Int. Cl.
*B01D 46/00*     (2006.01)
*F02M 35/024*    (2006.01)
*F02M 35/02*     (2006.01)

(52) U.S. Cl.
CPC ... *F02M 35/02416* (2013.01); *F02M 35/0202* (2013.01)

(58) Field of Classification Search
CPC ........ B01D 46/01; B01D 46/02; B01D 46/10; B01D 46/521; B01D 46/4236
See application file for complete search history.

(56) References Cited

U.S. PATENT DOCUMENTS 5,545,323 A * 8/1996 Koehler ................ B01D 29/111
                                                      210/493.2
2005/0183408 A1* 8/2005 Noller .................... F01N 3/0211
                                                        55/523
(Continued)

FOREIGN PATENT DOCUMENTS

DE       202005015126 U1   2/2007
FR          2855072 A1 * 11/2004 ............ B01D 46/10
(Continued)

*Primary Examiner* — Heidi Kelley
*Assistant Examiner* — Karla Hawkins
(74) *Attorney, Agent, or Firm* — James Hasselbeck

(57) ABSTRACT

A filter element (10) comprises filter bellows (16), in particular open filter bellows made of a filter medium (18), which has an oncoming flow side (28) and an outgoing flow side (30) for the fluid to be filtered. The filter element (10) is disposed in the filter housing (11) in such a way that it separates at least one inlet (15) from at least one outlet (17). An element axis (14) of the filter element (10) and a housing axis (25) of the filter housing (11) may be aligned in parallel with or axially to the installation direction (12) in the filter housing (11) for installing the filter element (10). The filter element (10) has at least one outer support section (38), which protrudes axially beyond the filter bellows (16) on the oncoming flow side (28) or the outgoing flow side (30) with respect to the element axis (14) and protrudes into an axial projection of the oncoming flow side (28) or the outgoing flow side (30) with respect to the element axis (14).
In addition, a respective filter housing (11) and/or a respective filter (13) is/are described.

14 Claims, 10 Drawing Sheets

(56) References Cited

U.S. PATENT DOCUMENTS

2012/0067013 A1    3/2012  Antony et al.
2013/0305930 A1*  11/2013  Oh ..................... B01D 46/0002
                                                             96/385

FOREIGN PATENT DOCUMENTS

WO    2013104794 A1    7/2013
WO    2013139992 A1    9/2013

* cited by examiner

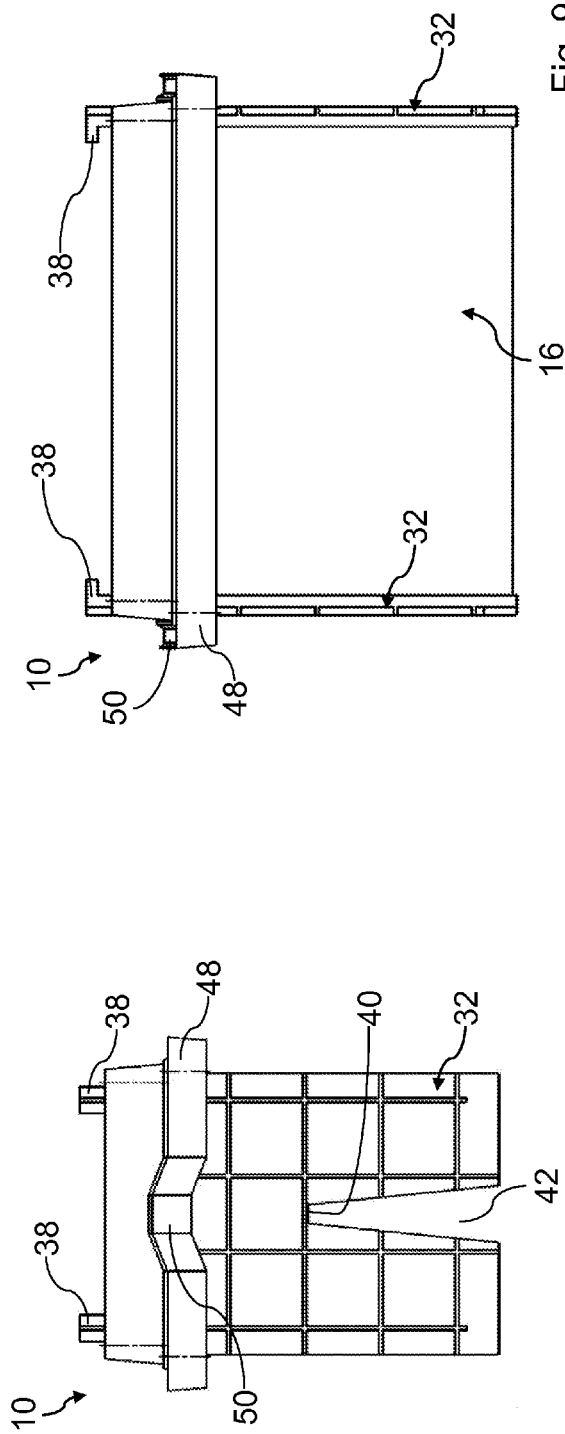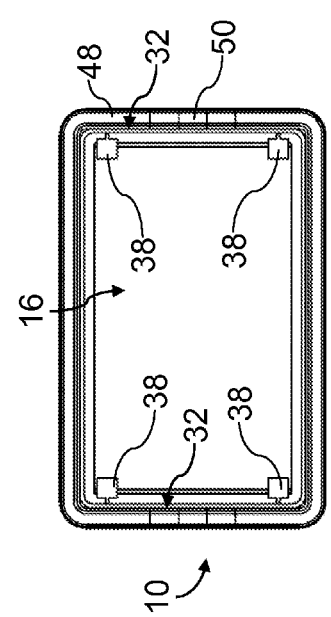

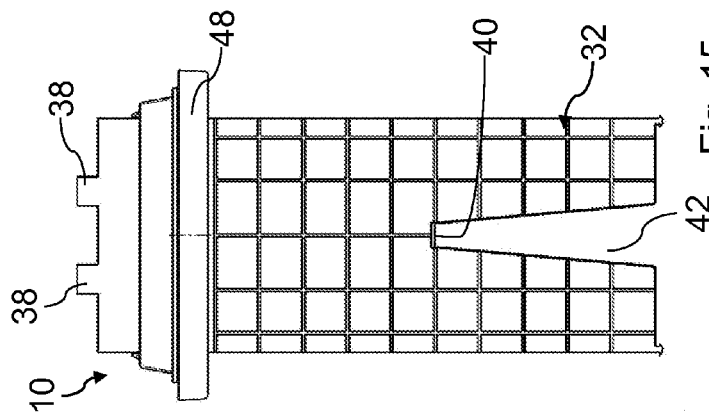
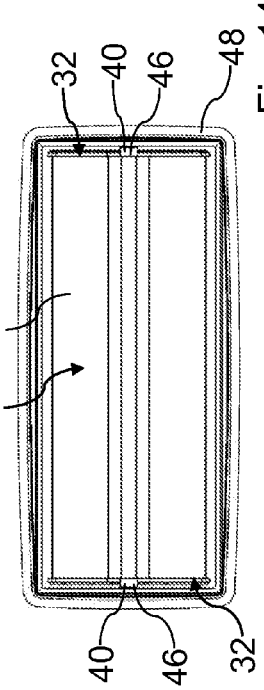
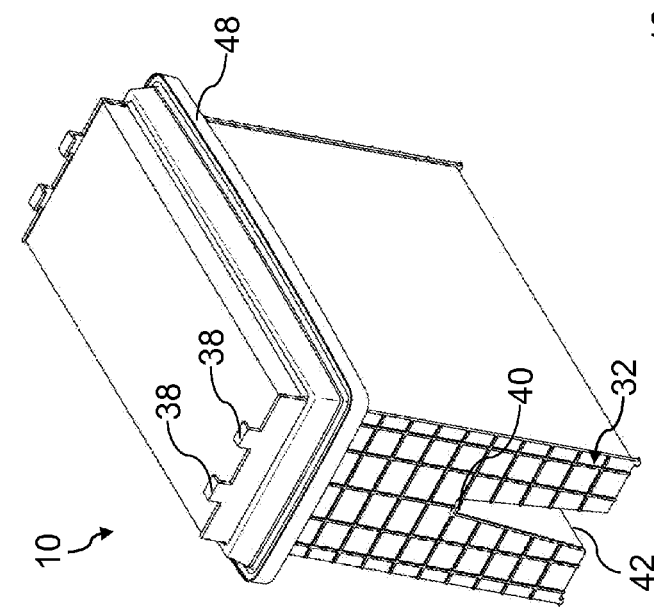

FILTER ELEMENT, FILTER WITH A FILTER ELEMENT AND A FILTER HOUSING OF A FILTER

CROSS-REFERENCE TO RELATED APPLICATION

This application claims the benefit of German patent application No. 10 2013 011 613.9, filed Jul. 12, 2013, the aforesaid German patent application being incorporated in its entirety herein by reference.

TECHNICAL FIELD

The invention relates to a filter element, in particular a flat filter element for installation in a filter housing of a filter for fluid, in particular an air filter, in particular for an internal combustion engine, in particular in a motor vehicle, with filter bellows, in particular open filter bellows made of a filter medium having an oncoming flow side and an outgoing flow side for the fluid to be filtered, and having an element axis, which can be aligned in parallel with or axially to the installation direction in order to install the filter element in the filter housing.

Furthermore, the invention relates to a filter for a fluid, in particular an air filter, in particular for an internal combustion engine, in particular for a motor vehicle, having a filter housing, which has at least one inlet and at least one outlet for fluid and having at least one filter element, in particular a flat filter element, in particular a filter element according to the invention, with filter bellows, in particular open filter bellows, made of a filter medium having an oncoming flow side and an outgoing flow side for the fluid to be filtered, wherein the filter element is disposed in the filter housing, in such a way that it separates at least one inlet from at least one outlet, wherein an element axis of the filter element and a housing axis of the filter housing may be aligned in parallel with or axially to the installation direction into the filter housing for installing the filter element.

Furthermore, the invention relates to a filter housing of a filter for fluid, in particular a filter according to the invention, in particular an air filter, in particular for an internal combustion engine, in particular in a motor vehicle, which has at least one inlet and at least one outlet for fluid, wherein a filter element, in particular a filter element according to the invention, in particular a flat filter element, can be disposed in such a way that it separates at least one inlet from at least one outlet, and which has a housing axis that can be aligned in parallel with or axially to the installation direction of the filter element into the filter housing for installing the filter element.

PRIOR ART

WO 2012/175438 A1 describes a filter device with a plate filter element for filtering fresh air for an internal combustion engine of a motor vehicle. The filter element has flat planar plate-shaped filter bellows, having an edge that is disposed peripherally and laterally as well as encompassing a cross section of the filter bellows, through which the flow can pass. The filter element is disposed in the interior of a filter housing. The filter device is preferably an air filter device for a motor vehicle in particular.

The invention is based on the object of designing a filter element, a filter and a filter housing of the type defined above in which retention and positioning of the filter element in the filter housing can be improved.

DISCLOSURE OF THE INVENTION

This object is achieved with a filter element according to the invention by the fact that the filter element has at least one outer support section, which protrudes axially beyond the filter bellows on the oncoming flow side or the outgoing flow side with respect to the element axis and protrudes into an axial projection of the oncoming flow side or the outgoing flow side with respect to the element axis. This yields a secure and space-saving support across the element axis.

In a preferred embodiment, the filter element also has at least one additional outer support section, in addition to the outer support section already described, and also has a central support section, such that the filter element has at least one triangular support with three support sections, each of which is disposed in at least some sections at the corners of the respective imaginary triangle, which is situated at or near to a peripheral side of the filter bellows with respect to the element axis, such that the two outer support sections are disposed opposite one another axially with respect to the element axis in the region of one of two flow-through sides of the filter bellows, and the central support section is set back axially with respect to the element axis in comparison with at least one section of the other flow-through side.

If, for the sake of simplifying the description, an imaginary X-Y-Z coordinate system is drawn in the filter element, the z axis of this coordinate system being disposed axially to the element axis, then the filter element with at least one triangular support may be supported and secured axially to the z axis on corresponding mating support sections in the filter housing on the housing end.

The outer support sections and the central support section are spaced an axial distance apart with respect to the element axis. At least one triangular support has an axial extent to the element axis. Thus, with at least one triangular support, it is possible to prevent tilting of the filter element across the z axis, i.e., in an X-Z plane and/or a Y-Z plane. Relatively large, in particular bulky and/or heavy and/or large filter elements that extend in at least one direction, in particular in the direction of the element axis in at least one direction, in particular in the direction of the element axis, are supported and positioned in stable and reliable positions in the filter housing. In particular filter elements having pleated filter media, which have deep pleats and/or variable pleat heights can thus be positioned reliably and secured in the filter housing.

One of the flow-through sides is the oncoming flow side of the filter bellows, while the opposite flow-through side is the outgoing flow side. Depending on the flow-through direction of the fluid through the filter bellows, the outer support sections are situated in the region of the oncoming flow side or the outgoing flow side.

The corresponding mating support sections on the housing side may be implemented through corresponding webs, ribs or shoulders in corresponding housing parts, in particular a housing cover and/or a housing pot of the filter housing. Positioning of the filter element in the filter housing can be simplified and improved in this way. The webs or ribs, if any, may advantageously be aligned in parallel with or axially to a housing axis of the filter housing.

An axial distance between one of the support sections, with respect to the element axis, in particular the central support section, and a flow-through side, in particular the outgoing flow side of the filter element, which faces at least one passage, in particular an outlet in the filter housing, may advantageously be smaller on the element side than on the housing side, in particular an axial distance between the corresponding mating support section, in particular the central mating support section, and at least one passage may be smaller in this way. It is thus possible to prevent the filter element from concealing at least one passage and thereby interfering with the fluid flow.

The filter housing may advantageously be designed in at least two parts. A central mating support section on the housing side may advantageously be disposed in a first one of the housing parts, in particular that housing pot. The outer mating support sections on the housing side may advantageously be disposed in a second one of the housing parts, in particular the housing cover.

At least one of the support sections, in particular at least one of the outer support sections may advantageously be situated in the vicinity of a rear side of the filter element with respect to the direction of installation. The rear side of the filter element may advantageously be the oncoming flow side.

The supporting function and the retaining function of at least one triangular support may advantageously be separated from any sealing function. This sealing function may be taken over by another part, in particular a seal. The support function and the sealing function may each be optimized separately from one another in this way. With at least one triangular support, it is possible to provide mechanical relief for the seal, if any. Any load on the seal, in particular due to vibration during operation of the filter, can therefore be reduced. Furthermore, this permits more freedom in the design of the shape, size and/or positioning. The type of fastening of the seal on the filter bellows may thus also be designed more freely. The seal may thus be connected directly or indirectly to the filter bellows, in particular by means of a carrier body, in particular by adhesive bonding.

At least one triangular support may advantageously extend over only a portion of the height, in particular at most half of the height of the filter element, in particular the filter bellows and/or optionally a corresponding end body, extending axially in relation to the element axis. Any installation tolerances in installation of the filter element can be compensated more easily in this way. It is thus possible to simplify assembly.

At least one of the support sections and/or at least one of the mating support sections on the housing side may advantageously be made of or contain plastic. Plastic can be processed and machined easily. Complex shapes can also be implemented easily with plastic. Flexible parts, in particular elastic parts can also be made of plastic.

At least one of the support sections may advantageously be attached to the filter bellows indirectly in particular by means of an end body or directly in a materially bonded and/or form-fitting and/or force-locking manner, in particular by means of adhesive bonding, welding and/or integral molding, casting, injection molding, plug connection, locking, tying and/or clamping or the like.

The filter element may advantageously be suitable for filtering air. It may also be provided for filtering other types of fluids, in particular gases or liquids. A corresponding filter element may thus also be used for filtering fuel, oil, water or urea solution in particular.

The filter element may advantageously be used in an internal combustion engine in a motor vehicle.

The filter element may advantageously be disposed in an air filter of a commercial vehicle, in particular a truck, a bus, a construction site vehicle or an agricultural machine. Such filter elements may be of larger dimensions in comparison with filter elements for passenger vehicles. However, the filter element may also be used in passenger vehicles.

The invention may also be used outside of automotive engineering, in particular in industrial motors. It is also possible to use the invention outside of internal combustion engines, in particular in automotive engineering.

With open filter bellows, the filter medium is not closed to form a hollow body. In contrast to that, the filter medium in a hollow filter element, in particular a so-called round filter element, is closed on the periphery and encloses an interior.

The filter element may advantageously be a flat filter element. The filter element may be flat or curved. The oncoming flow side and/or the outgoing flow side of the filter bellows may be flat, curved or graduated. The filter element may also be box-shaped.

The filter bellows may be approximately in the shape of a polyhedron, for example. The filter bellows may advantageously be cube-shaped, cuboid, pyramidal, prismatic, wedge-shaped or the like. It is not necessary for all sides, in particular the peripheral sides of the filter bellows to be flat. Some of the sides of the filter bellows may also be curved or graduated. Opposite sides may run in parallel. Alternatively or additionally, they may also run obliquely or be otherwise not parallel to one another.

The housing axis of the filter element may advantageously be parallel or axial to the installation direction of the filter element in the filter housing. The dismantling direction is usually opposite the installation direction. The element axis of the filter element may advantageously be a central axis and/or an axis of symmetry. The element axis may advantageously intersect the flow-through sides, in particular the oncoming flow side and the outgoing flow side of the filter element. The element axis and/or the direction of installation may advantageously run perpendicular to these sides in the case of a flat flow-through side, in particular a flat oncoming flow side and/or a flat outgoing flow side. The main direction of flow of the fluid to be filtered through the filter bellows may advantageously run parallel or axially to the element axis and/or to the direction of installation.

The filter medium may be a filter paper, a filter nonwoven, a meltblown nonwoven, a woven fabric or some other type of filter medium suitable for filtering fluid, in particular air. The filter medium may advantageously be pleatable.

Alternatively, the filter bellows may also have a fluid-permeable in particular air-permeable filter foam. The filter bellows may be implemented as a solid block of such a filter foam.

According to the invention, at least the outer support sections protrude axially beyond the filter bellows on the oncoming flow side and the outgoing flow side with respect to the element axis and extend into an axial projection of the oncoming flow side or the outgoing flow side with respect to the element axis. This makes it possible to prevent at least one support section from protruding beyond the filter bellows across, i.e., transversely to, the element axis, i.e., in the direction of the x axis and/or the y axis. It is thus possible to achieve the result that the lateral extent of the filter element is not increased further by at least one support section.

At least one outer support section may advantageously be curved radially inward.

At least one outer support section may advantageously be or have a type of strap or arm.

In another advantageous embodiment, at least one of the support sections may comprise and/or be an elastic section and/or be resilient.

At least one support section may advantageously cooperate elastically with a corresponding mating support section of the filter housing. A positional tolerance of the filter element in the filter housing can be compensated in this way. Furthermore, this makes it easy to implement a vibration damping solution. In one end position of the filter element, at least one support section may be in elastic contact with the filter housing, in particular the corresponding mating support section, under a mechanical tension.

At least one support section may advantageously be elastically movable and/or shapeable and/or resilient with at least one direction component axially in relation to the element axis. An equalization of a positional tolerance in the axial direction can be achieved in this way.

At least one support section, in particular at least one of the outer support sections may advantageously be designed as a spring element, in particular a spring arm. The spring element may advantageously be curved accordingly.

The elastic support section may advantageously be situated in a rear region of the filter bellows, as seen in the installation direction. The elastic support section may advantageously be situated on a side facing the housing cover in the installed state of the filter element.

At least one elastic support section may advantageously have elastic material, in particular an elastic plastic, in particular an elastomer, preferably polyurethane or be made thereof. With plastic, it is easy to implement elastically resilient properties and/or shapes in particular. Elastic properties can be implemented with an elastomer, in particular polyurethane.

At least one support section, in particular the central support section may advantageously have an elastically compressible element. The elastically compressible element may advantageously be an elastomer.

In another advantageous embodiment, corresponding outer support surfaces of the outer support sections may be directed at least partially opposite one another axially with respect to the element axis to a support surface of another support section, in particular the central support section. The filter element, in particular the triangular support, can be secured axially in this way between corresponding mating support sections on the housing side with respect to the element axis.

In another advantageous embodiment, the imaginary triangle of at least one triangular support may be an equilateral triangle, such that the two outer support sections may be situated on the corners with the base of the equilateral triangle. This makes it possible to implement a symmetrical support.

The median of the base side of the equilateral triangle may advantageously run parallel to the element axis. The median of the base of the equilateral triangle may advantageously be disposed centrally on the peripheral side of the filter bellows, as seen peripherally with respect to the element axis.

In another advantageous embodiment, the filter element may have at least two triangular supports. The filter element may be supported and/or positioned in different locations in this way. The filter element can thus be supported and/or positioned more uniformly in the filter housing. The risk of tilting of the filter element can thereby be reduced. Relatively heavy and/or large filter elements can therefore be positioned and secured precisely in the filter housing.

The two triangular supports may advantageously be disposed on radially opposite sides with respect to the element axis, in particular peripheral sides, in particular front edge sides of the filter bellows. The filter element can be supported and/or positioned even better in this way.

At least two triangular supports may advantageously be symmetrical with respect to the element axis, in particular with respect to an axis of symmetry of the filter element, optionally with at least one end body, in the sense of an axial symmetry. The filter element can be installed in the filter housing in at least two different positions in this way. This makes it possible in particular to simplify so-called blind assembly, in which the orientation of the filter elements in the filter housing cannot be discerned easily during assembly.

Alternatively, at least two triangular supports may be asymmetrical with respect to the axis of symmetry. The possible installation positions of the filter element in the filter housing can be limited in this way. The filter element can advantageously be installed in only one definite position in the filter housing.

At least two triangular supports may advantageously have different shapes, extents and/or curves to implement the asymmetry. Alternatively or additionally, at least two triangular supports may advantageously be disposed asymmetrically with respect to the element axis.

In another advantageous embodiment, the filter medium may be pleated. Due to the pleating of the filter medium, the ratio between the active filter area and the design volume of the filter bellows can be improved.

The filter medium may be pleated in a zigzag pattern to form the filter bellows. With filter elements, in particular flat filter elements with an open filter bellows, the filter media are not closed, i.e., end pleats just like end edges are not joined together. In contrast with that, the filter media are shaped to form closed filer bellows, i.e., their end pleats are joined together in hollow filter elements, in particular round filter elements. The end pleats are the two outer pleats on opposite end sides, in particular longitudinal sides of the filter bellows. The end borders are the two free borders of the filter medium, which run along the end pleats and border them on the end sides of the filter bellows. The end edges of the filter bellows are the two other free borders of the filter bellows, which extend between the end edges and run according to the pleating of the filter bellows. The pleat edges are the edges along which the filter medium is pleated. With cube-shaped filter bellows pleated in a zigzag pattern, the end borders and the pleat edges are straight and run parallel to one another. The end edges run in a zigzag pattern and are perpendicular to the end borders and the pleat edges. The end edges each span an end edge side of the filter bellows. In the pleated filter medium, the oncoming flow side of the filter bellows is spanned by the flow edges on the oncoming flow side. The outgoing flow side is spanned by the pleat edges of the filter bellows on the outgoing flow side.

The filter bellows may advantageously have deep pleats. When the filter bellows are approximately cube-shaped, we then speak of deep pleats in particular when the pleat height is approximately at least as great as the extent in the direction of the pleat edges and/or in the direction transversely to the pleat edges.

The triangle of at least one triangular support may advantageously extend approximately parallel to the pleat height of the pleats of the filter element. The triangle comprised of at least one triangular support may advantageously extend approximately at a right angle to the pleat edges. The pleat edges of the filter medium may advantageously run perpendicular to the element axis at least on a flow-through side of the filter bellows in particular on the oncoming flow side.

In another advantageous embodiment, an axial height with respect to the element axis, in particular the pleat height of the filter bellows, may be varied.

Filter shapes which vary within the filter bellows may advantageously also be provided. The pleat heights and/or pleat shapes may then vary within at least one of the pleats. Alternatively or additionally, the pleat heights and/or pleat shapes may also vary between the pleats, in particular neighboring pleats. A curved shape of the flow-through side, in particular the oncoming flow side and/or the outgoing flow side may be implemented in this way. The pleat heights at the center of the filter bellows in particular may be larger or smaller than those in the region of the longitudinal sides, in particular the end pleats. Alternatively, the filter bellows may also be graduated by corresponding variation in the pleat heights. The filter bellows may thus be of different heights in the region of the end sides, in particular the end pleats.

The filter element may advantageously be flat or curved and/or graduated on a flow-through side, in particular the outgoing flow side, in particular in the form of a circular cylinder or an oval cylinder or the like.

In another advantageous embodiment, at least one of the support sections may be disposed on an end body, in particular an end disk of the filter element.

The filter bellows and the entire filter element can be stabilized with at least one end body. Furthermore, the filter bellows can be tightly sealed to at least one end body on the corresponding side in particular. Furthermore, at least one end body may serve as a connecting element and/or as a retaining element with which the filter element can be guided, positioned and/or retained in a more stable manner.

Corresponding end bodies may be disposed advantageously on multiple peripheral sides of the filter bellows. The stability of the filter element can be improved further in this way. At least one end body may also extend over a plurality of peripheral sides, in particular the entire periphery of the filter bellows.

End bodies may be joined together advantageously on different peripheral sides of the filter bellows by means of a frame section. The frame section may advantageously extend around the periphery with respect to the element axis. The frame section may advantageously be connected in one piece to at least one of the end bodies.

An end body may be disposed advantageously on opposite peripheral sides of the filter bellows. The end bodies may advantageously be situated on opposite sides of the filter bellows with respect to the direction of installation of the filter element and/or the element axis.

With a pleated filter medium, at least one end body may be situated on an end edge side of the filter bellows. At least one end body may be connected tightly to the end edge side. In this way at least one end body may tightly seal the end edge side of the filter bellows.

Each of the two end edge sides of the filter bellows may advantageously be sealed with an end body.

At least one end body may advantageously be an end disk. An end disk is flat in one direction of extent in relation to the other directions of extent. The design space required for the end body and thus also the filter element can be reduced on the whole in this way.

At least one end body may be provided with a rib structure with which the stability of the end body can be increased.

At least one end body may advantageously comprise or be made of plastic.

At least one end body may be made of plastic in particular and may have a mechanical damping effect in particular. Furthermore, plastic can be shaped easily, in particular by casting or injection molding. The support can be further improved with an end body made up of or comprising plastic.

At least one end body, in particular the end body made of plastic, may advantageously be connected to the filter bellows in a materially bonded manner, in a form-fitting and/or force-locking manner, in particular by means of welding, adhesive bonding, molding, casting, injection molding of a plug connection, a latching connection, a press connection and/or a clamping connection or in some other way.

At least one of the support sections may advantageously be connected to at least one end body.

At least one support section can be manufactured easily in this way together with the corresponding end body, in particular by prefabrication. At least one end body with at least one support section can easily be connected to the filter element, in particular to the filter bellows. This may advantageously take place in one operation.

At least one support section and at least one end body may advantageously be joined together in one piece. Stability can be increased with a one-piece connection. It is then possible to omit any additional fastening elements and/or additional assembly steps for joining at least one support section to at least one end body.

At least one end body with at least one support section may advantageously be made easily of plastic, in particular by injection molding or casting.

Instead of being in one piece, at least one support section may also be connected directly or indirectly to the end body as a separate part or on a separate part. The separate part may advantageously be connected to at least one end body. Alternatively, the separate part may be connected directly to the filter bellows.

In another advantageous embodiment, the end body may have an approximately V-shaped recess, the tip of which points toward the flow-through side, in particular the oncoming flow side of the filter bellows in the area of which the outer support sections are disposed, the opposite border of the end body, in particular on the oncoming flow side, being open on the edge, which is opposite this flow-through side axially with respect to the element axis, and on the tip of which the central support section is disposed.

At least one of the side regions of the recess, which is defined by one of the legs, may advantageously have at least one guide surface. On installation of the filter element, the central mating support section of the filter housing may be guided on at least one guide surface. Both side regions of the recess may advantageously be designed as guide surfaces. The recess may thus function as a type of funnel in which the central mating support section can easily be guided to the central support section of the filter element.

In a preferred variant, the V-shaped recesses on the end bodies are of different depth so that the respective central support sections are disposed differently in the axial direction on the respective tip of the recesses. Supporting webs on the housing side end in different places in the axial direction accordingly, so the filter element can be installed in the filter housing in only one definite position.

In another advantageous embodiment, at least one seal running peripherally with respect to the element axis may be disposed on the filter element.

The seal may advantageously protrude radially with respect to the element axis beyond the filter bellows on at least one outer peripheral side.

The seal may advantageously be closed on the periphery.

The filter housing may advantageously have at least one sealing section, in particular a sealing groove to receive the seal. The sealing section on the housing side may advantageously be implemented in conjunction with corresponding connecting flanges of the housing pot and/or of the housing cover.

At least one seal may advantageously be disposed in the vicinity of one of the flow-through sides, in particular the oncoming flow side of the filter bellows. The seal may be positioned easily between the connecting flanges of the housing pot and of the housing cover and sealed there.

At least one seal may advantageously have a sealing effect axially with respect to the element axis. This means that the seal has at least one axial sealing surface, which is directed parallel to the element axis with at least one direction component. The axial sealing surface may advantageously cooperate with a corresponding axial sealing surface of the filter housing, this surface being directed parallel to the housing axis with at least one direction component. Alternatively or additionally, the seal may also have a sealing effect radially.

In another advantageous embodiment, at least one seal may be disposed axially between the outer support sections and the central support section with respect to the element axis. The outer support sections and the central support section may be disposed on different sides of at least one seal in this way.

The outer support sections may advantageously be disposed on the crude side of the filter element, and the central support section may be disposed on the clean side or vice versa.

In another advantageous embodiment, at least one seal may have at least one bulge. The bulge may be convex or concave.

At least one bulge may advantageously be located on the peripheral side of the filter bellows on which at least one triangular support is also disposed. At least one bulge may be elevated with respect to the element axis from the inside radially to the outside radially or vice versa. Additionally or alternatively, at least one bulge may also be elevated axially with respect to the element axis.

The shape of at least one sealing section of the guide housing may correspond to the shape of the seal. In particular at least one sealing section may have at least one recess, bulge and/or elevation for accommodating at least one bulge in the seal.

Furthermore, the object according to the invention is achieved with a filter element according to the invention and with a filter housing, which has mating support sections, each for supporting one of the support sections.

The advantages and features presented above in conjunction with the filter element according to the invention and its advantageous designs are applicable for the filter according to the invention accordingly and vice versa.

Furthermore, the object is achieved according to the invention with a filter housing, which has mating support sections, each for supporting one support section of the filter element.

The advantages and features presented above in conjunction with the filter element according to the invention and the filter according to the invention and their respective advantageous embodiments are applicable accordingly for the filter housing according to the invention and vice versa.

BRIEF DESCRIPTION OF THE DRAWINGS

Additional advantages, features and details of the invention are derived from the following description in which exemplary embodiments of the invention are explained in greater detail with reference to the drawings. Those skilled in the art will also expediently consider individually the features that are disclosed in combinations in the drawings, the description and the claims, and will combine them into other appropriate combinations. The figures show schematically the following in various diagrams and detailed views:

FIG. 8 shows a transverse view of the air filter element of FIG. 7;

FIG. 9 shows a longitudinal view of the air filter element of FIG. 7;

FIG. 10 shows a top view of the air filter element of FIG. 7;

FIG. 13 shows an isometric diagram of an air filter element of an air filter according to a fourth exemplary embodiment;

FIG. 14 shows a bottom view of the air filter element in FIG. 13;

FIG. 15 shows a transverse side view of the air filter element in FIG. 13;

The same parts in the figures are labeled with the same reference numerals.

Exemplary Embodiments of the Invention

Figures 1, 2:
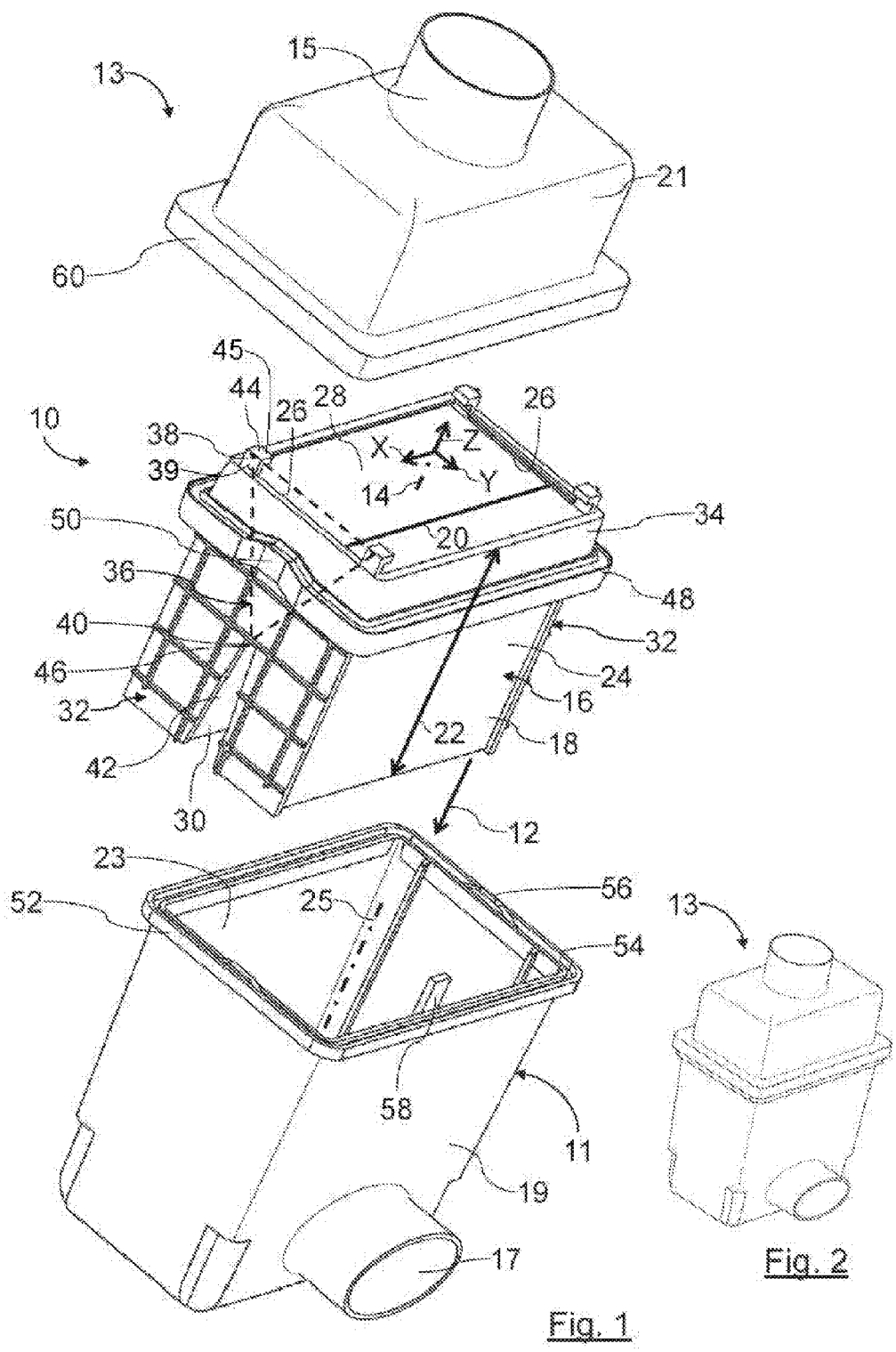
FIG. 1 shows an exploded diagram of an air filter having an air filter element which has a triangular support on each of its end edge sides for supporting the air filter element in an air filter housing according to a first exemplary embodiment.
FIG. 2 shows an isometric diagram of the assembled air filter of FIG. 1.
Figure 6:
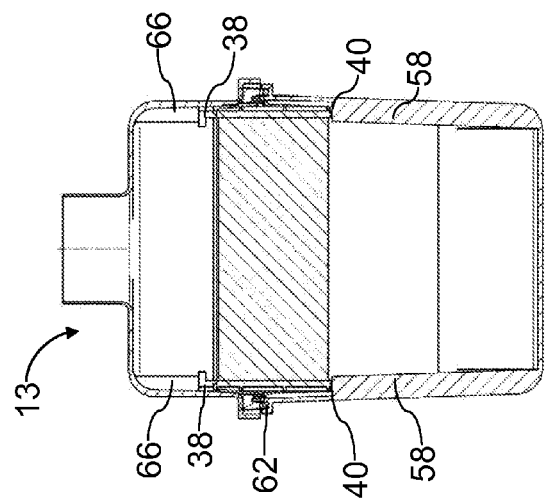
FIG. 6 shows a longitudinal section of the air filter along a sectional line VI-VI in FIG. 3.

FIGS. 1 to 6 show an air filter 13 of an internal combustion engine of a motor vehicle according to a first exemplary embodiment in different views. The air filter 13 includes a filter element 10, which is disposed in a filter housing 11 that can be opened so that the filter element can be replaced and it separates and air inlet 15 of the filter housing 11 from an air outlet 17. The filter housing 11 is assembled from a housing pot 19 and a housing cover 21. The housing pot 19 has the air outlet 17. The housing cover 21 includes the air inlet 15. The air filter 13 serves to filter the combustion air which is supplied for operation of the internal combustion engine.

In the exemplary embodiment shown here, the installation direction 12 of the filter element 10 in the housing pot 19 runs parallel to an element axis 14. A housing axis 25 of the filter housing 11 runs coaxially with the element axis 14 when the air filter 13 is assembled. The element axis 14 runs parallel to a z axis of and X-Y-Z coordinate system, for example, which is shown in FIG. 1 to simplify the description. The filter element 10 can be inserted through the installation opening 23 into the housing pot 19.

The filter element 10 is designed as a flat filter element. The filter element 10 includes filter bellows 16, which are approximately cube-shaped on the outside and are made of a filter medium 18 pleated in a zigzag pattern. The filter medium 18 may be filter paper, a filter nonwoven or some other pleatable filter medium suitable for filtering air. The filter bellows 16 may also be an unpleated filter medium, for example, a filter foam. The filter medium 18 is pleated along the pleat edges 20. The pleat edges 20 run parallel to one another and perpendicular to the element axis 14. The pleat edges 20, for example, run parallel to an x axis of the X-Y-Z coordinate system.

FIG. 1 shows at the top, for example, one of the pleat edges 20 on the oncoming flow end. Pleat heights 22 of the pleated filter medium 18 extend parallel to the element axis 14, i.e., in the direction of the z axis. The maximum axial height of filter bellows 16 with respect to the element axis 14 in the direction of the z axis is greater than the width of the filter bellows 16 in the direction of the y axis. The pleats can therefore be described as deep.

The pleat heights 22 of the pleats positioned on the inside vary from one pleat to the next in the direction of the y axis, i.e., perpendicular to the pleat edges 20 and perpendicular to the element axis 18. The pleat heights 22 of the pleats at the center of the filter bellows 16 are smaller than the pleat heights 22 of the outer pleats on the longitudinal sides 24 of the filter bellows 16. The longitudinal sides 24 are formed by the end pleats of the filter bellows 16. The curve in the Y-Z plane is approximately V-shaped due to the pleat edges 20 on the outgoing flow end at the bottom in FIG. 1 of the pleats on the inside.

End edge sides 26 of the filter bellows 16 are spanned by end edges of the filter medium 18, which are concealed in the figures. The end edges of the filter medium 18 have approximately a zigzag shape. The end edge sides 26 are situated on sides that are radially opposite one another with respect to the element axis 14. The end edge sides 26 run parallel to one another and perpendicular to the oncoming flow side 28 and the outgoing flow side 30. The oncoming flow side 28 and the outgoing flow side 30 are each spanned by the pleat edges 20 on the oncoming flow side and/or the outgoing flow side. The end edge sides 26 connect the two opposite longitudinal sides of the filter bellows 16 which are parallel to the X-Z plane and together with them form the periphery of the filter bellows 16.

The oncoming flow side 28 at the top in FIG. 1 is situated on the side facing the housing cover 21 when the filter element 10 is installed.

The outgoing flow side 30 at the bottom in FIG. 1 is situated on the side facing the pot bottom of the housing pot 19.

During operation of the filter element 10, the filter bellows 16 have air flowing through them from the incoming flow side 28 to the outgoing flow side 30 according to the present exemplary embodiment. The main direction of flow of the air through the filter bellows 16 in the present example thus runs parallel to the installation direction 12 and to the element axis 14. Flow can also pass through the filter bellows 16 in the opposite direction. The terms "oncoming flow side" and "outgoing flow side" are switched in this case accordingly.

An end disk 32 is tightly connected to the end edges of the filter medium 18 on the end edge sides 26 of the filter bellows 16. The end disks 32 are each made of plastic. The end disks 32 are approximately rectangular on the outside. The borders of the end disks 32 on the outgoing flow side and the outgoing flow side 28 itself are situated on the side facing the housing cover 21 above the air outlet 17 when the filter element 10 is installed.

The end disks 32 are connected to one another in one piece by means of a frame section 34. The frame section 34 surrounds the filter bellows 16 on the oncoming flow side 28, closing it on the periphery with respect to the element axis 14.

The filter element 10 has a triangular support 36 on each end edge side 26 with two outer support sections at the top in FIG. 1 and a central support section 40 at the bottom. The support sections 38 and 40 are each disposed on the corners of an imaginary triangle which is indicated with dotted lines in FIG. 1. The triangles are each located next to the corresponding end edge side 26. The triangles are equilateral triangles. The two outer support sections 38 are located at the corners of the equilateral triangle with the base side. The base sides of the equilateral triangles run parallel to the y axis.

The two outer support sections 38 are each disposed in the area of the oncoming flow side 28. The central support sections 40 are each situated approximately centrally when considered axially with respect to the element axis 14. It is set back axially with respect to most of the outgoing flow side 30.

The outer support sections 38 are each implemented as approximately L-shaped arms, which are connected in one piece to an end with the oncoming flow edge of the corresponding end disk 32. The outer support sections 38 each extend with a first leg 39 parallel to the z axis. The first leg 39 protrudes axially beyond the filter bellows 16 on the oncoming flow side 28 with respect to the element axis 14. The second leg 45 of the "L" is aligned in parallel with the x axis. At its free end, it points toward the corresponding opposite end disk 32. This second leg 45 protrudes into an axial projection of the oncoming flow side 28 of the filter bellows 16 with respect to the element axis 14.

The end bodies 32 each have a V-shaped recess 42, the tips of which point toward the oncoming flow side 28. The V-shaped recesses 42 are flush with the V-shaped profile of the outgoing flow side 30, as seen in the direction of the x axis. The recesses 42 are open toward the outgoing flow edge of the respective end disk 32. The central support sections 40 are disposed in the tips of the V-shaped recesses 42.

With respect to its outside, the filter element 10 has axial symmetry with the element axis 14 on the whole and has mirror symmetry with the X-Z plane.

The outer support surfaces 44 of the outer support section 38 are disposed axially to the element axis 14 toward the housing cover 21. Central support surfaces 46 of the central support sections 40 are directed axially away from the housing cover 21 with respect to the element axis 14 and toward the bottom of the housing pot 19. The outer support surfaces 44 and the central support surfaces 46 are thus directed opposite one another.

A seal 48 which is designed as a profiled seal surrounds the filter bellows 16, the end disks 32 and the frame section 34, so that it is closed peripherally with respect to the element axis 14. The seal is in the region of a rear peripheral edge of the frame section 34, as seen from the oncoming flow side 28. The seal 48 is disposed axially with respect to the element axis 14 between the outer sealing sections 38 and the central sections 40.

The seal 48 has a bulge 50 near each end disk 32. The bulges 50 are each located approximately centrally between the longitudinal sides 24 of the filter bellows 16, as seen in the direction of the y axis. The bulges 50 are each elevated in the direction of the z axis away from the outgoing flow side 30 and toward the housing cover 21.

Furthermore, the end disks 32 are each provided with reinforcing ribs, which run in a grid pattern, on their outsides facing away from the filter bellows 16.

A connecting flange 52 on the pot side of the housing pot 19 surrounds the installation opening 23 on the periphery with respect to the element axis 14. The connecting flange 52 on the pot side has a sealing groove 54 on the periphery with respect to the element axis 40 for the seal 48, which is open on its side facing the housing cover 21. The walls of the sealing groove 54 cooperate with the seal 48 as sealing surfaces when the filter element 10 is installed. The connecting flange 52 on the pot side has corresponding elevations 56 in the sealing groove 52 to receive the bulges 50 of the seal 48.

The housing pot 19 has two mating supporting webs 58 on the pot side. The mating supporting webs 58 on the pot side are each disposed so they fit with respect to the corresponding central support sections 40 with respect to the housing axis 25 and are disposed radially opposite with respect to the housing axis on the peripheral side of the housing pot 19 on the inside radially. The mating supporting webs 58 on the pot side each extend in the X-Z plane. The mating supporting webs 58 on the pot side are positioned approximately centrally on the corresponding side wall of the housing pot 19, as seen in the direction of the y axis. A respective distance in the direction of the z axis between the ends of the mating supporting webs 58 on the pot side and the connecting flange 52 on the pot side, these ends facing the connecting flange 52 on the pot side, such that this distance corresponds to a corresponding distance between the seal 48 and the central support sections 40 on the filter element 10.

The air outlet 17 is in one of the side walls of the housing pot 19, which is disposed next to one of the longitudinal sides 24 of the filter element 10 when the filter element 10 is installed.

Figure 5:
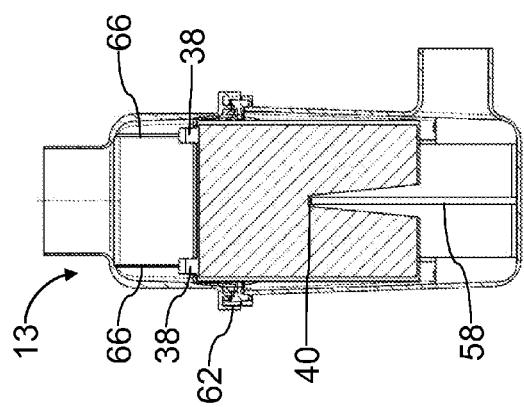
FIG. 5 shows a second transverse longitudinal section of the air filter along a sectional line V-V in FIG. 3.
Figure 3:
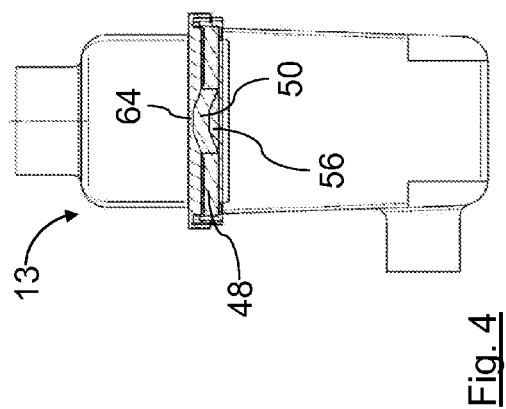
FIG. 3 shows a top view of the air filter of FIG. 2.
Figure 4:
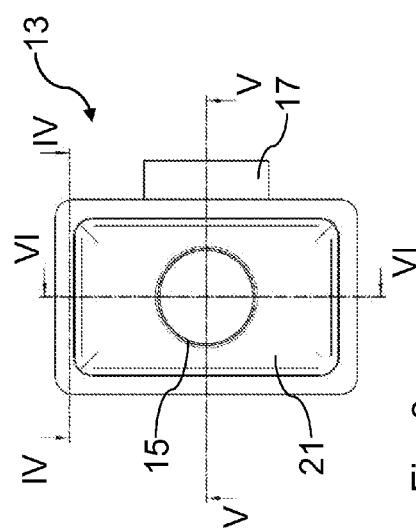
FIG. 4 shows a first transverse longitudinal section of the air filter along a sectional line IV-IV in FIG. 3.
Figure 7:
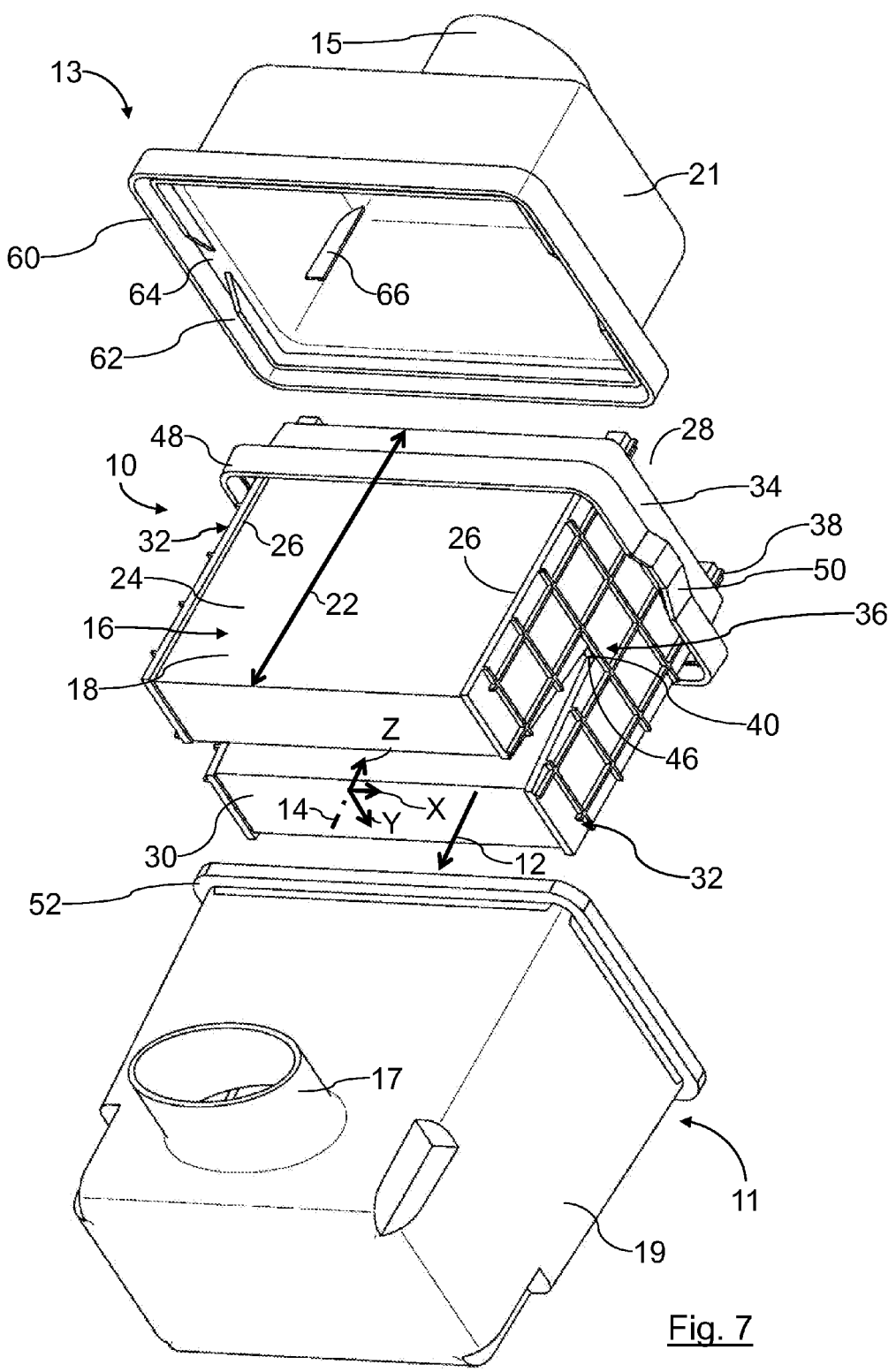
FIG. 7 shows an exploded diagram of an air filter having an air filter element according to a second exemplary embodiment.

The housing cover 21 has a connecting flange 60 on the cover side with a sealing groove 62 on the cover side, which is shown in FIG. 5 in particular. The sealing groove 62 on the cover side is open on its side facing the housing pot 19. A peripheral wall of the connecting flange 60 on the over side, said peripheral wall being on the inside radially with respect to the housing axis 25, has corresponding bulges 64 to receive the corresponding bulges 50 in the seal 48. One of the bulges 64 is shown in FIG. 4 in particular.

The housing cover 21 has a total of four mating supporting webs 66 on the cover side, two of which are shown in FIG. 5 in particular. The mating supporting webs 66 on the cover side are each designed to fit with the corresponding outer support sections 38 on opposite sides of the housing axis 25, where they are disposed on the peripheral side of the housing cover 21, which is on the inside radially. The mating supporting webs 66 on the cover side each extend parallel to the X-Z plane. Two of the mating supporting webs 66 on the cover side are situated on opposite sides on the corresponding side wall of the housing cover 21, as seen in the direction of the y axis. A respective distance in the direction of the z axis between the ends of the mating supporting webs 58 on the cover side, facing the connecting flange 60 on the cover side, and the connecting flange 60 on the cover side corresponds to a corresponding distance between the seal 48 and the outer support surfaces 44 of the outer support section 38 on the filter element 10.

The air inlet 15 is situated in a cover wall of the housing cover 26, which is opposite the oncoming flow side 28 of the filter element 10 when the filter element 10 is installed.

For installation in the filter housing 11 the filter element 10 with the outgoing flow side 30 at the front is inserted through the installation opening 23 into the housing pot 19 with the ends of the mating supporting rubs 58 on the pot side facing the connecting flange 52 on the pot side being guided between the side walls of the recesses 42. The side walls of the recesses 42 thus function as guide surfaces.

As soon as the central support surfaces 46 of the central support sections 40 of the filter element 10 abut against the ends of the mating supporting webs 58 on the pot side, any further movement of the filter element 10 in the installation direction 12 is brought to a stop. In this position, the seal 48 fits into the sealing groove 54 on the pot side. The elevations 56 on the pot side then engage in the corresponding bulges 50 in the seal 48.

Then the housing cover 21 is placed on the housing pot 19 and the filter housing 11 is closed. An outer peripheral wall of the connecting flange 60 on the cover side, the wall being on the outside radially with respect to the housing axis 25, extends around a peripheral wall of the connecting flange 52, which is on the outside radially and extends around it on the outside radially when in the end position. The peripheral wall, which is on the inside radially, of the connecting flange 60 on the cover side presses against the seal 48 in the axial direction with respect to the element axis 14, so that the bulges 50 in the seal 48 engage with the bulges 64 in the connecting flange 60 on the cover side. The seal 48 is thus clamped tightly between the connecting flanges 52 and 60.

In the end position of the filter element 10, the ends of the mating supporting web 66 on the cover side, facing the connecting flange 60 on the cover side, abut against the outer support surfaces 44 of the outer support sections 38.

The filter element 10 is secured axially with respect to the z axis between the mating supporting webs 58 on the pot side and the mating supporting webs 66 on the cover side. Furthermore, the central support sections 40 are secured on the ends of the mating supporting webs 58 on the pot side in the direction of the y axis because of the V shape of the recesses 42. Oscillation or tilting of the filter element 10 in the filter housing 11 is thus prevented in this way.

FIGS. 7 to 10 show a filter element 10 according to a second exemplary embodiment. In contrast with the first exemplary embodiment in FIGS. 1 to 6, the bulges 50 in the seal 48 in the second exemplary embodiment are further elevated toward the outside radially with respect to the element axis 14.

Figures 11, 12:
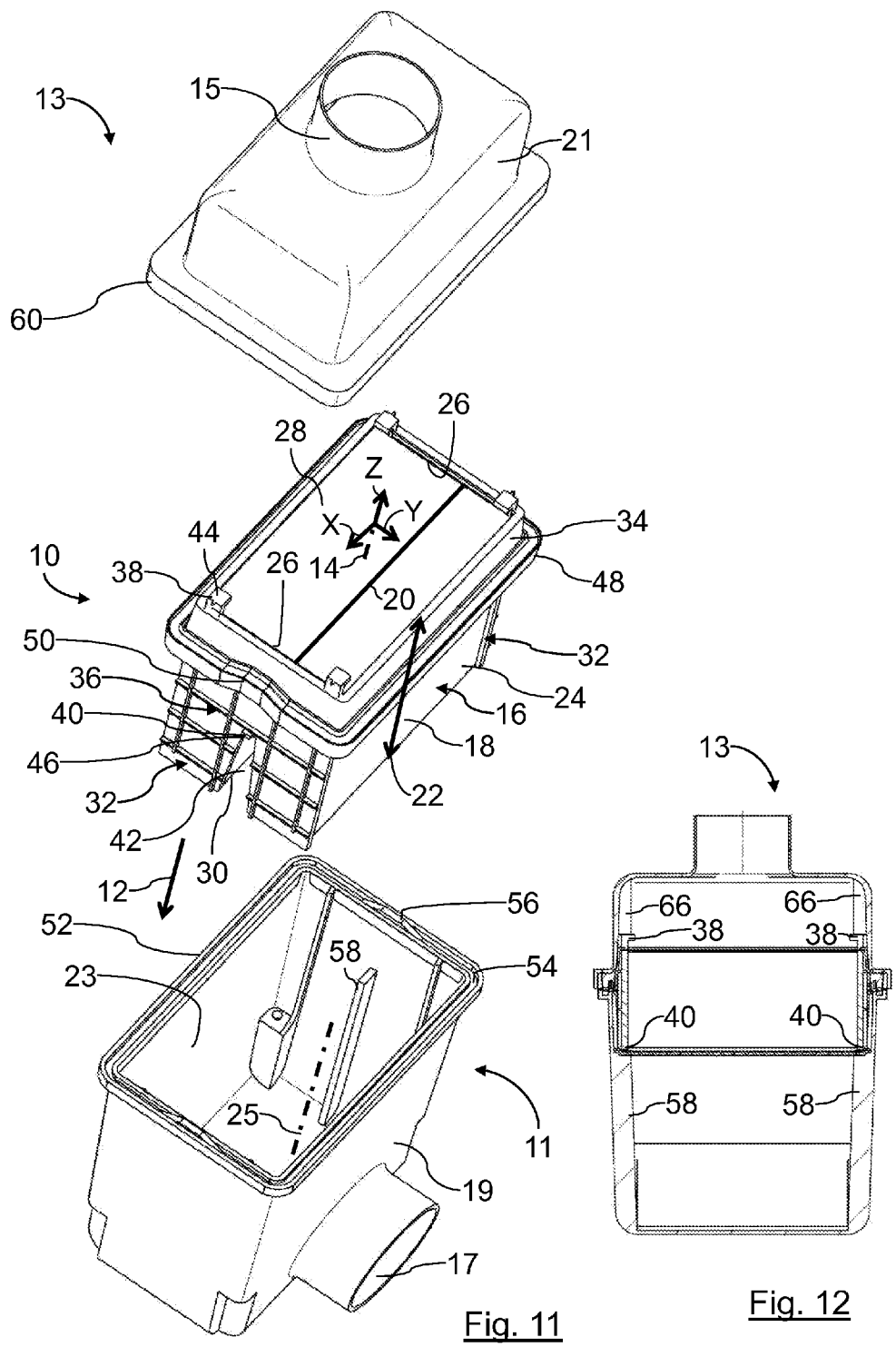
FIG. 11 shows an exploded diagram of an air filter having an air filter element according to a third exemplary embodiment.
FIG. 12 shows a longitudinal section of the assembled air filter from FIG. 11.
Figure 19:
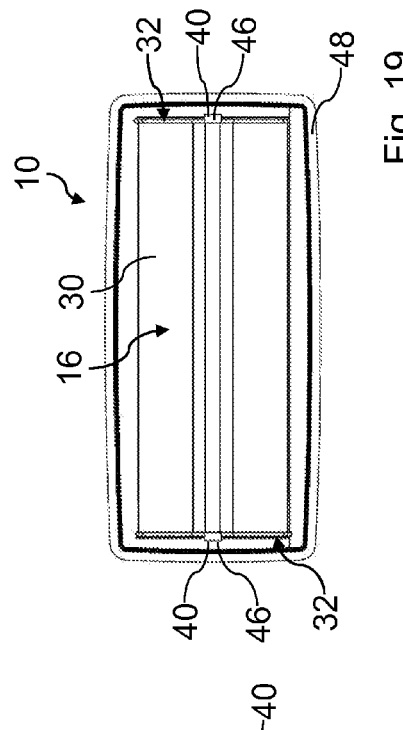
FIG. 19 shows a bottom view of the air filter element in FIG. 16.
Figure 18:
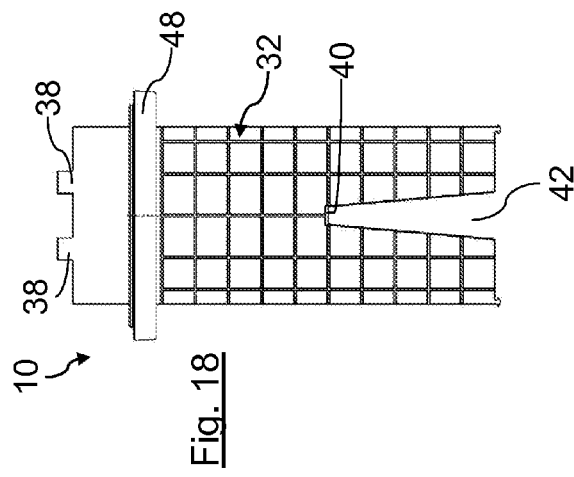
FIG. 18 shows a transverse side view of the air filter element in FIG. 16.
Figure 16:
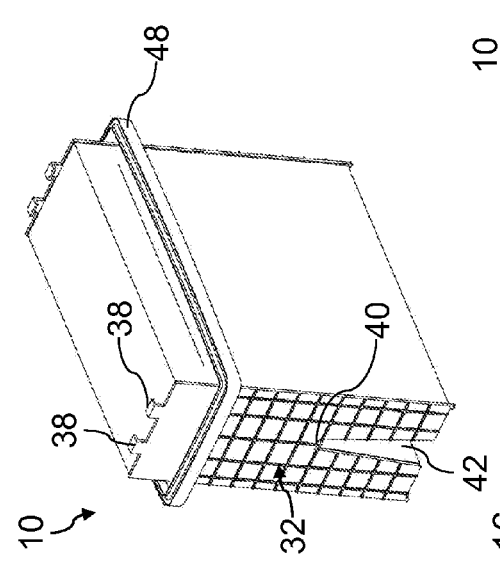
FIG. 16 shows an isometric diagram of an air filter element of an air filter according to a fifth exemplary embodiment.
Figure 17:
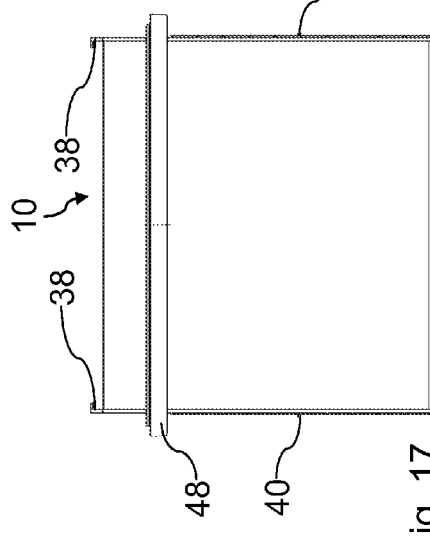
FIG. 17 shows a longitudinal side view of air filter element in FIG. 16.

FIGS. 11 and 12 show a filter element 10 according to a third exemplary embodiment. In contrast with the first exemplary embodiment in FIGS. 1 to 6, in the third exemplary embodiment, the central support sections 40 are lengthened toward the outside radially with respect to the element axis 14 in the form of a short web.

FIGS. 13 to 15 show a filter element 10 according to a fourth exemplary embodiment. In contrast with the first exemplary embodiment in FIGS. 1 to 6, in the third exemplary embodiment, the outer support sections 38 are further removed from the longitudinal sides 24 of the filter element 10. Furthermore, the height of the filter element 10 in the direction of the element axis 14 is greater in comparison with the width than in the first exemplary embodiment. Furthermore, in the fourth exemplary embodiment, the bulges 50 in the seal 48 are omitted.

FIGS. 16 to 19 show a filter element 10 according to a fifth exemplary embodiment. In contrast with the fourth exemplary embodiment in FIGS. 13 to 15 in particular, the frame section 34 is omitted in the fifth exemplary embodiment.

Figure 22:
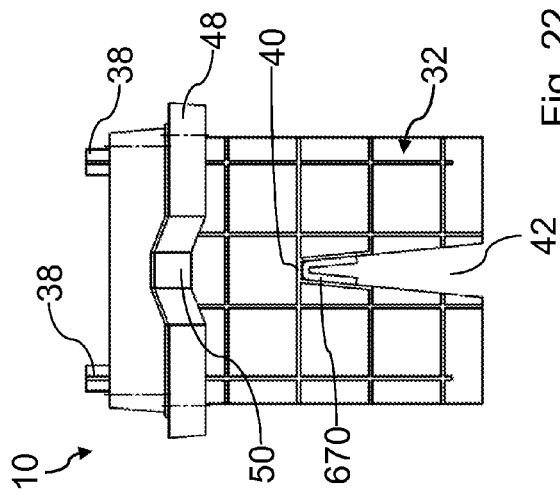
FIG. 22 shows a transverse side view of the air filter element in FIG. 20.
Figure 21:
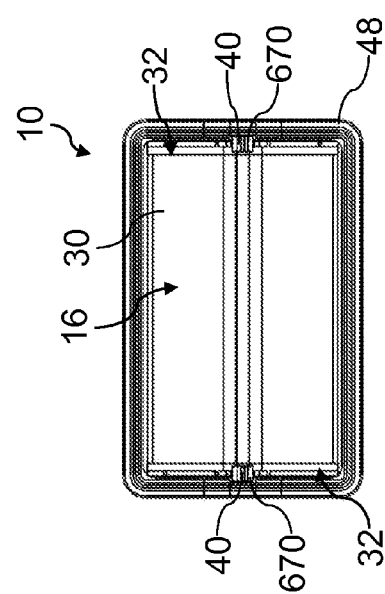
FIG. 21 shows a bottom view of the air filter element in FIG. 20.
Figure 20:
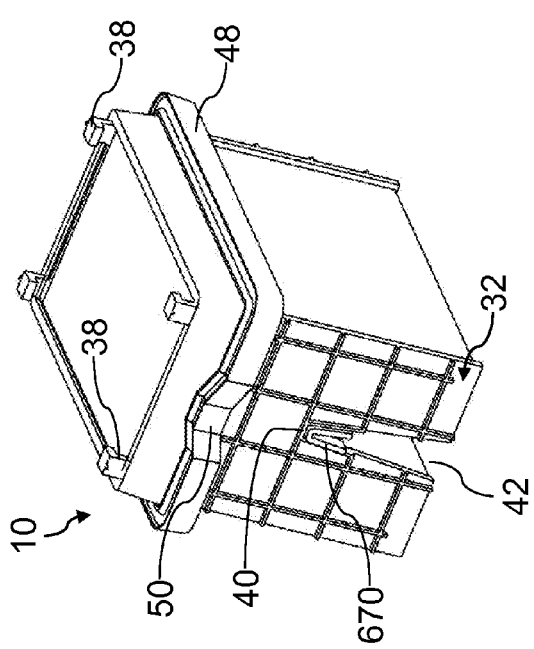
FIG. 20 shows an isometric diagram of an air filter element of an air filter according to a sixth exemplary embodiment.

FIGS. 20 to 22 show a filter element 10 according to a sixth exemplary embodiment. In contrast with the first exemplary embodiment in FIGS. 1 to 6, an elastic element 670 is disposed on the central support sections 40 in the sixth exemplary embodiment. The elastic elements 670 are made of an elastomer or self-adhesive foam strips. When the filter element 10 is installed, the elastic elements 670 are each positioned between the central support surfaces 46 and the ends of the corresponding mating supporting webs. It is possible in this way to compensate for a tolerance in position in the direction of the element axis 14 and/or the housing axis 25.

Figure 25:
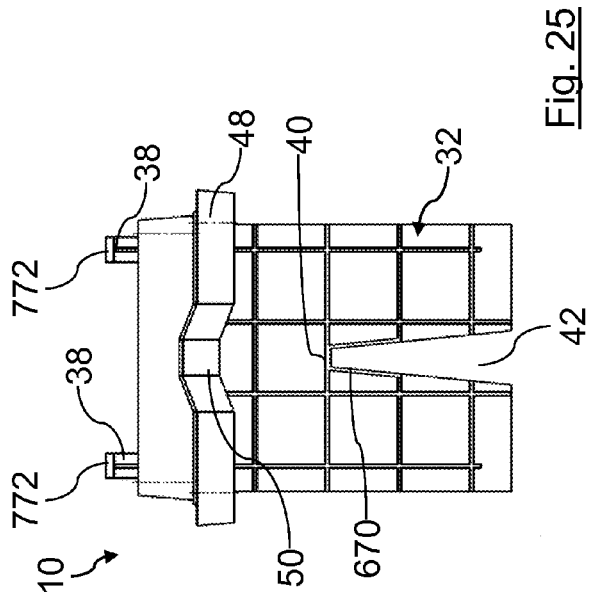
FIG. 25 shows a transverse side view of the air filter element in FIG. 23.
Figure 24:
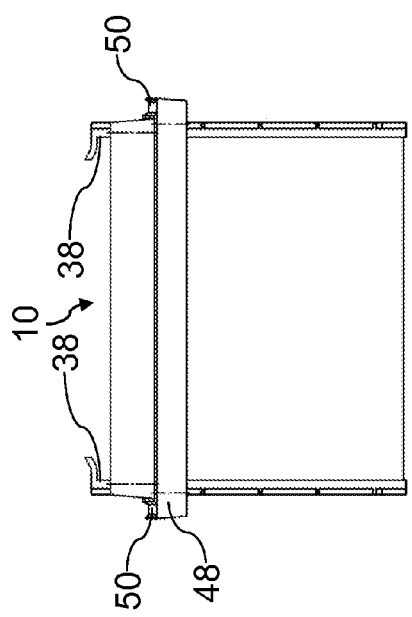
FIG. 24 shows a longitudinal side view of the air filter element in FIG. 23.
Figure 23:
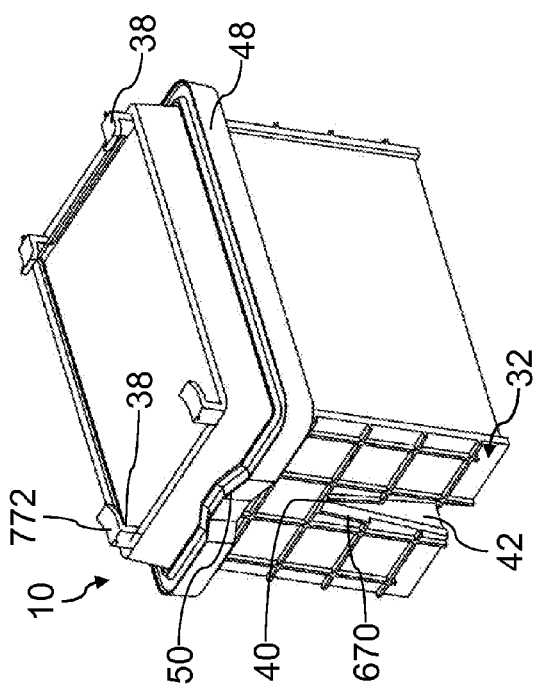
FIG. 23 shows an isometric diagram of an air filter element of an air filter according to a seventh exemplary embodiment.

FIGS. 23 to 25 show a filter element 10 according to a seventh exemplary embodiment. In contrast with the sixth exemplary embodiment in FIGS. 20 to 22, the outer support sections 38 in the seventh exemplary embodiment are designed as elastic spring elements. The legs 772 of the outer support sections 38, which are directed across the element axis 14 here are elastically resilient in the axial direction to the element axis 14. The outer support sections 38 may thus be supported with elastic resilience on the mating supporting webs 66 on the cover side.

Figure 28:
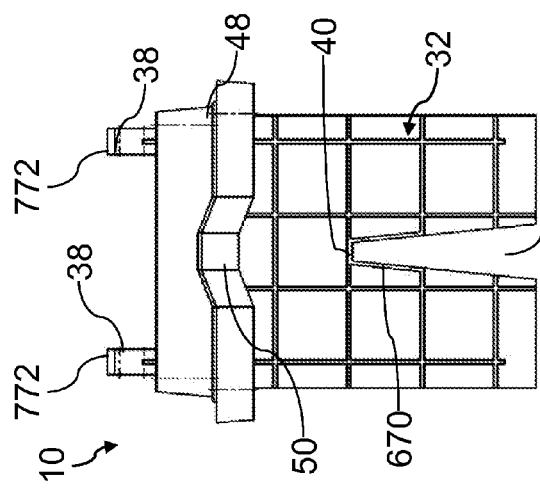
FIG. 28 shows a transverse side view of the air filter element in FIG. 26.
Figure 27:
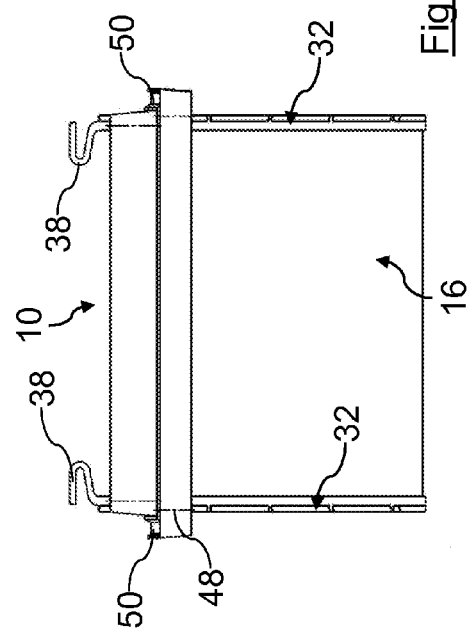
FIG. 27 shows a longitudinal side view of the air filter element in FIG. 26.
Figure 26:
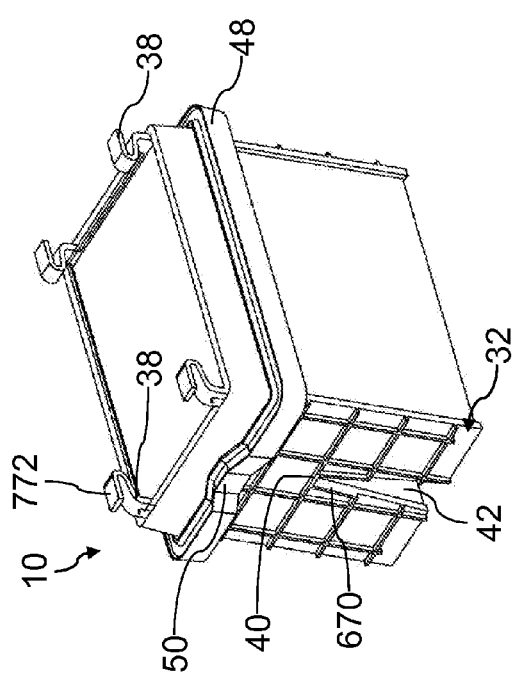
FIG. 26 shows an isometric diagram of an air filter element of an air filter according to a eighth exemplary embodiment.

FIGS. 26 to 28 show a filter element 10 according to an eighth exemplary embodiment. Like the seventh exemplary embodiment in FIGS. 23 to 25, in the eighth exemplary embodiment the outer support section 38 are designed as elastic spring elements. In contrast with the seventh exemplary embodiment, in the eighth exemplary embodiment, the legs of the outer support sections 38 directed across the element axis 14 are curved in a U shape. The open side of the "U" points toward the outside radially with respect to the element axis 14. The U-shaped profile of the legs 772 of the outer support sections 38 is elastically resilient in the axial direction to the element axis 14. The outer support sections 38 may thus be supported with elastic resilience on the mating supporting webs 66 on the cover side.

The invention claimed is:

1. A filter element for installation in a filter housing of a filter for fluid, comprising:
   an open filter bellows of a filter medium, which has an oncoming flow side and an outgoing flow side for the fluid to be filtered, and
   having an element axis, which can be aligned in parallel with or axially to the installation direction for installing the filter element in the filter housing,
   wherein the filter medium is pleated having a plurality of pleats, each pleat formed by a filter medium fold having an oncoming flow side pleat edge and an outgoing flow side pleat edge,
   wherein the element axis is an axis extending through the filter bellows from the oncoming flow side to the outgoing flow side;
   a first end disk arranged on an end edge side of the pleats, the first end disk having an a first end disk edge arrange at either the oncoming flow side or the outgoing flow side of the filter bellows;
   wherein the first end disk has an elongated slit forming an opening extending completely through the first end disk from an outer side to the inner side of the first end disk, the elongated slit beginning at the first end disk edge and continuing through the first end disk in a direction of the element axis towards an opposing second end disk edge of the first end disk;
   wherein the elongated slit forms a central support surface at a tip of the elongated slit arranged opposite the first end disk edge,
   wherein the elongated slit is configured to receive and engage a main supporting web of the filter housing when in an installed condition,
   wherein a pleat height of each pleat of the filter bellows is defined as a distance from the oncoming flow side pleat edge to the outgoing flow side pleat edge of the pleat;
   wherein the pleat height of the filter bellows varies across the plurality of pleats;
   wherein the pleat height varies at the first end disk following the elongated slit of the first end disk;
   wherein at least one outer support section is provided, the at least one outer support section having:
      a first leg having a first end connected onto the opposing second end disk edge of the first end disk, the first leg protruding axially beyond the filter bellows on the oncoming flow side or the outgoing flow side with respect to the element axis to an opposing second end;
      a second leg having a first end connected directly onto the second end of the first leg, the second leg protruding in a direction traverse to the element axis into an axial projection of the oncoming flow side or the outgoing flow side with respect to the element axis, such that the first leg and the second leg form an "L-shaped" support section.

2. The filter element according to claim 1, wherein
   one outer support surface of the outer support sections is directed to be at least partially opposite the central support surface of a central support section, with respect to the element axis.

3. The filter element according to claim 1, including
at least one seal running peripherally with respect to the element axis disposed on the filter element and is disposed axially with respect to the element axis between the outer support section and the elongated slit.

4. The filter element according to claim 1, wherein
at least one of the support sections has at least one elastic section or is elastic and axially resilient.

5. The filter element according to claim 2, wherein
the filter element has, in addition to the outer support section, at least one additional outer support section as well as the central support section, such that the filter element has at least one triangular support with three support sections, which are each disposed in at least some sections at the corners of the respective imaginary triangle which is situated at or near a peripheral side of the filter bellows with respect to the element axis,
wherein the two outer support sections are disposed in a region of one of two axially opposite flow-through sides of the filter bellows with respect to the element axis, and
the central support section is disposed with an axial setback with respect to the element axis opposite at least one section of the other flow-through side.

6. The filter element according to claim 5, wherein
the imaginary triangle of at least one triangular support is equilateral, wherein the two outer support sections are located at the corners with the base side of the equilateral triangle.

7. The filter element according to one of claim 5, wherein
the filter element has at least two triangular supports.

8. The filter element according to claim 1, wherein
the least one outer support section is formed on the first end disk.

9. The filter element according to claim 8, wherein
the elongated slit is a V-shaped slit in the first end disk with a widest end of the V-shaped slit arranged at the first end disk edge, the V-shaped slit continuing through the first end disk in a direction of the element axis towards an opposing second end disk edge of the end disk,
wherein the central support surface at arranged at a tip of the V-shaped slit,
wherein the pleat height varies in a V-shape following the V-shaped slit of the first end disk.

10. The filter element according to claim 1, wherein
at least one seal has at least one axially outwardly projecting bulge at a first side of he at least one seal, the bulge projecting axially in a direction of the element axis away from adjacent portions of the at least one seal.

11. An air filter for an internal combustion engine, comprising
a filter housing which has at least inlet and at least one outlet for fluid, and with
at least one filter element according to claim 1,
wherein the filter element is disposed in the filter housing in such a way that it separates at least one inlet from at least one outlet,
wherein the element axis of the filter element and a housing axis of the filter housing can be aligned in parallel or axially to the installation direction in the filter housing for installing the filter element,
wherein the filter housing has a main supporting web arranged in the filter housing received into the elongated slit of the filter element and abutting against the central support surface of the elongated slit,
wherein the filter housing has at least one supporting web arranged in the filter housing and abutting against the at least one outer support section of the filter element.

12. A filter housing of a filter for fluid according to claim 11 for filtering air in an internal combustion engine, the filter housing having
at least one inlet and
at least one outlet for fluid,
the filter housing adapted to receive at least one filter element according to claim 1 such that it separates at least one inlet from at least one outlet and which has a housing that can be aligned in parallel with or axially to the installation direction of the filter element in the filter housing for installing the filter element,
wherein the filter housing has a main supporting web arranged in the filter housing received into the elongated slit of the filter element and abutting against the central support surface of the elongated slit,
wherein the filter housing has at least one supporting web arranged in the filter housing and abutting against the at least one outer support section of the filter element.

13. The filter element according to claim 10, wherein
wherein the at least one axially outwardly projecting bulge forms a recess on an opposing side of the at least one seal, the recess receding axially in a same direction as the at least one axially outwardly projecting bulge projects such that the recess is recessed axially relative to adjacent portions of the at least one seal.

14. The filter element according to claim 10, wherein
wherein the at least one axially outwardly projecting bulge is aligned in the direction of the element axis with the elongated slit such that the at least one axially outwardly projecting bulge is positioned axially over the elongated slit.

* * * * *